United States Patent [19]
Grecsek

[11] Patent Number: 6,088,801
[45] Date of Patent: Jul. 11, 2000

[54] MANAGING THE RISK OF EXECUTING A SOFTWARE PROCESS USING A CAPABILITIES ASSESSMENT AND A POLICY

[76] Inventor: Matthew T. Grecsek, 5338 Cypress Creek Dr., Orlando, Fla. 32811-7606

[21] Appl. No.: 08/781,691

[22] Filed: Jan. 10, 1997

[51] Int. Cl.[7] .................................................. G06F 12/14
[52] U.S. Cl. ............................................................ 713/200
[58] Field of Search .............................. 395/186, 187.01, 395/188.01, 200.59, 701, 702, 703, 704, 705, 706, 183.14; 380/4, 25

[56] References Cited

U.S. PATENT DOCUMENTS

| | | |
|---|---|---|
| 4,919,545 | 4/1990 | Yu . |
| 4,941,175 | 7/1990 | Enescu et al. ............................... 380/4 |
| 5,173,939 | 12/1992 | Abadi et al. . |
| 5,220,603 | 6/1993 | Parker . |
| 5,319,776 | 6/1994 | Hile et al. . |
| 5,335,346 | 8/1994 | Fabbio . |
| 5,339,403 | 8/1994 | Parker . |
| 5,359,659 | 10/1994 | Rosenthal . |
| 5,414,844 | 5/1995 | Wang . |
| 5,421,006 | 5/1995 | Jablon et al. . |
| 5,452,442 | 9/1995 | Kephart . |
| 5,475,839 | 12/1995 | Watson et al. ........................... 395/186 |
| 5,542,045 | 7/1996 | Levine . |
| 5,544,322 | 8/1996 | Cheng et al. . |
| 5,564,016 | 10/1996 | Korenshtein ............................. 395/186 |
| 5,802,277 | 7/1996 | Cowlard .................................. 395/186 |

OTHER PUBLICATIONS

Balderston, Jim, "ActiveX Security Questions Raised with Internet Explorer," *Infoworld*, Sep. 9, 1996, p.6, InfoWorld Publishing Company, San Mateo, CA.

Gaudin, Sharon, "Hostile Applets Call For Caution," *Computerworld*, Sep. 9, 1996, p. 54, IDG, Framingham, MA.

Hayes, Frank, "Corporate IS Frets About Java Security," *Computerworld*, Sep. 9, 1996, p. 68, IDG, Framingham, MA.

Hayes, Frank, "Developers Worried About Safety of Java and ActiveX," *Computerworld*, Oct. 7, 1996, p. 1. IDG, Framingham, MA.

Hayes, Frank, "Web Developers Face Security Quandary," *Computerworld*, Jul. 29, 1996, p. 52, IDG, Framingham, MA.

Leopold, George, "Web Security Threat Grows," *Electronic Engineering Times*, Nov. 4, 1996, p. 1, CMP Publications, Manhasset, New York.

Wolfe, Alexander, "Browse This!" *Electronic Engineering Times*, Sep. 9, 1996, p. 69, CMP Publications, Manhasset, New York.

*Primary Examiner*—Robert W. Beausoliel, Jr.
*Assistant Examiner*—Pierre E. Elisca

[57] ABSTRACT

A method and apparatus for managing the risk of executing a software process on a computer by programmatically determining the capabilities of the software process before it executes and determining whether these capabilities are authorized within an access control policy. The capabilities define what functions a software process can perform in the context of a virtual machine. The method comprises the steps of assessing the software process to determine what capabilities it possesses, maintaining one or more policies which list potential capabilities and corresponding authorizations for one or more contexts, and a unit for comparing the software process capabilities with a policy.

15 Claims, 1 Drawing Sheet

MANAGING THE RISK OF EXECUTING A SOFTWARE PROCESS USING A CAPABILITIES ASSESSMENT AND A POLICY

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

When a user executes a program on a computer there is an implied assumption that it will not cause undesirable effects. Yet the user has no way to tell in advance from looking at the software object code or buttons on the screen what capabilities the process has or what will really happen when the process is executed. A user could execute a process intending to display a humorous animated graphic and in the background the process could be doing any number of undesirable things, such as examining the user's personal records and transmitting them to a third party without the user's knowledge. By disguising unexpected functionality as a familiar or non-threatening program, most defensive security techniques can be circumvented. Once a process gains access to a computer, there are generally no limits to what it can do. As computers play increasingly important roles in business and society, the effects of unexpected functionality in software can be devastating, far exceeding the loss of time or the cost of the system.

The substantial growth in use of public data networks such as the Internet and online services compounds the problem. Combined with network anonymity and ubiquity, the hidden capabilities of executable software have the potential to be destructive and harmful in new ways, including theft of property and confidential information. Users face a difficult quandary: useful applications require certain privileges in order to operate, yet granting these privileges to untrusted sources poses a tremendous risk that many users find to be unacceptable.

A large body of prior art exists for implementing defensive security measures that are designed to protect resources from external threats. Cryptography techniques insure that messages are protected during transmission. Yet, they offer no protection after messages are received, which can include unauthorized invocations of services located on the user's computer. Authentication techniques do not address the problem because risk must ultimately be determined by each user based on their own unique context. Acceptable risk for one user may not be acceptable for another. Moreover, once a user authorizes an authenticated process for a particular purpose, there is nothing to prevent other unrelated processes from using the methods of the authenticated process in an unauthorized manner.

Access control techniques protect resources from unauthorized use by maintaining a security policy to define who can access particular resources within the system. Access rights are set up in advance by a system administrator where the requester/grantor relationship is well-defined and remains fairly static over time. It is impractical to create separate access control policies for every new software process created, each with unique access requirements that might change continually. Moreover, the determination of which software is trusted and the functions it is trusted to perform, can vary widely from system to system and may change over time. Access control methods are generally not applicable where a trust relationship cannot be defined in advance.

Another body of prior art deals with software integrity, including various methods for detecting and removing viruses. A computer virus is an executable assemblage of computer instructions that attaches itself to a host computer process where the subsequent execution of the viral code can have undesirable effects. Virus detection operates by scanning a potential host program to determine if it contains a predefined sequence of data that might indicate the presence of a virus attachment. These methods are inadequate because, by definition, they do not evaluate the capabilities of the potential host program itself, which can contain undesirable code. Virus detection software cannot differentiate useful sequences of instructions from harmful sequences that are valid capabilities of a host program. For example, a program that is not infected with a virus may have the capability to erase files in an undesirable way, yet such a program would not trigger a warning using virus detection methods Some programming languages attempt to solve the problem of unlimited access to resources by limiting the capabilities of their processes. For example, a language might prevent processes from accessing a computer's local files. Although this offers a measure of protection, these languages suffer from limited utility value because meaningful applications require more extensive capabilities.

In light of this discussion of the prior art and the need for an improved method for managing the risk of executing software processes, the present invention is disclosed.

BRIEF SUMMARY OF THE INVENTION

This invention is directed to managing the risk of executing software processes. It is an object of the invention to provide a method for determining the capabilities of a software process before it executes. It is another object of the invention to provide a method for managing access to the resources of a computer using a capabilities-based policy. Further objects and advantages will become apparent from consideration of the ensuing description.

DETAILED DESCRIPTION OF THE INVENTION

Figure 1:
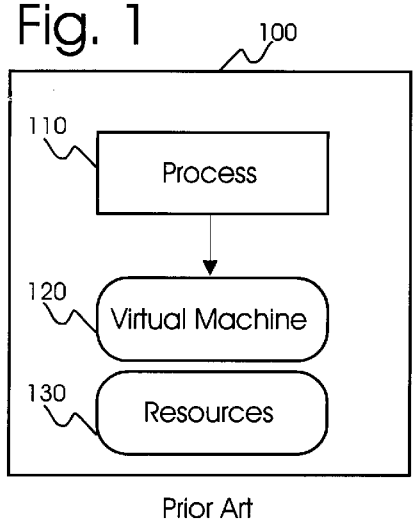
FIG. 1 is a block diagram illustrating how the execution of software has direct access to a user's resources.

FIG. 1 illustrates how a software process 110 that executes on a computer 100 has access to a plurality of resources 130. Resources 130 may be any item under control of computer 100, such as an application program or operating system functions, or resources 130 may include such items as data, devices, or other services. A capability is one or more instructions executed by a virtual machine 120 on computer 100 to perform a function as might occur in a computer program or interpreted script. If a certain function requires a particular sequence of instructions and process 110 does not contain these instructions then process 110 cannot perform the function. Process 110 is defined by one or more capabilities, each capability being defined by one or more instructions. Prior to execution, process 110 is simply data and cannot perform any function until executed. Process 110 may be executed directly by the user or indirectly by some other process already executing on computer 100. Virtual machine 120 is an interface to computer 100 and resources 130 and may itself be a process. Computer 100 may be any programmable device.

Computer 100 users may not be aware of how resources 130 are accessed or manipulated by any process 110 that they directly or indirectly execute. In general, users have no advance warning if process 110 contains undesirable capabilities. Moreover, such a determination as to what may or may not be undesirable is subjective and must be made by individual users in the context of their own practice.

Figure 2:
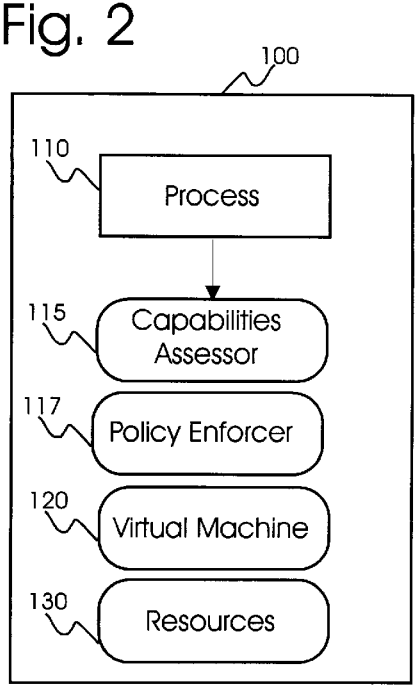
FIG. 2 is a block diagram illustrating how the execution of software must pass through a capabilities assessor and policy enforcer before gaining access to a user's resources.

An object of the invention is to provide a means for determining the capabilities of process 110 before it executes. It is also an object of the invention to provide a means for enforcing a policy based on these capabilities. FIG. 2, illustrates how the invention accomplishes these objects. Prior to execution by virtual machine 120, process 110 is evaluated by a capabilities assessor 115. The results of the evaluation may be passed to a policy enforcer 117, which grants or denies process 110 access to virtual machine 120 and resources 130 based on a policy.

Figure 4:
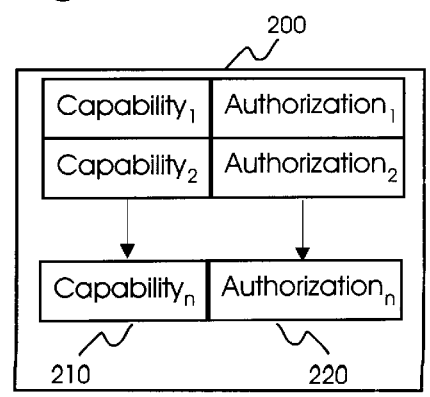
FIG. 4 is a sample data structure for maintaining a policy based on capabilities assessment.

A policy contains a list of potential capabilities that process 110 may possess and authorizations indicating which capabilities are acceptable. FIG. 4 illustrates a possible data structure for a policy 200 to store a capabilities list 210 and a corresponding authorizations list 220. The capabilities list 210 may specify various virtual machine 120 functions such as communications or file access. Capabilities list 210 may either be constant across all policies or vary depending on the type or context of process 110. In addition, capabilities list 210 may be extendible by the user. An authorization 220 can be as simple as a one bit flag indicating that the corresponding capability 210 is either acceptable or not, or it can specify additional criteria for more comprehensive rules as described below. Usually a policy is decided by the person or organization who has authority over computer 100. The concerns in deciding a policy depend on the operational requirements.

Figure 3:
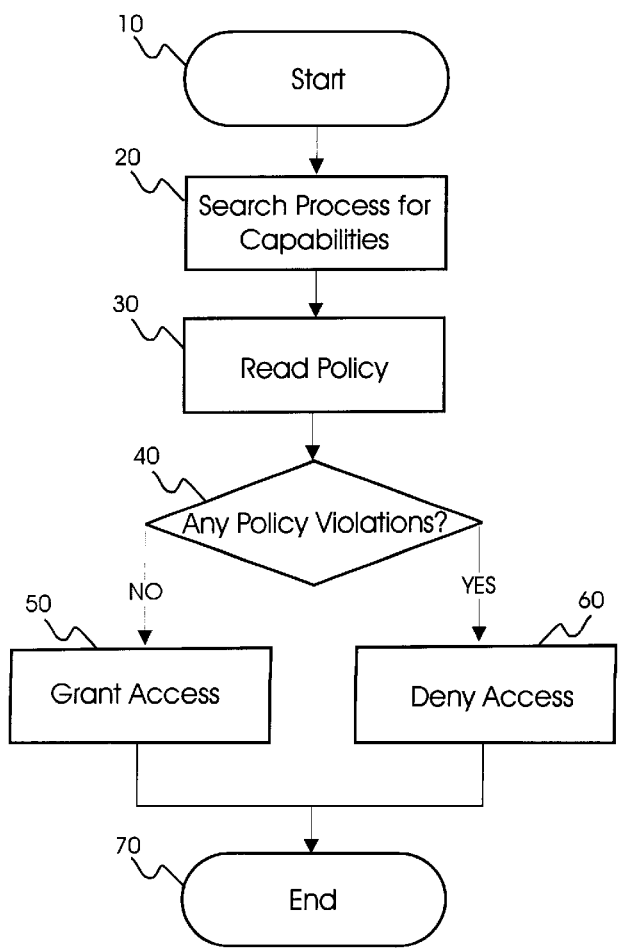
FIG. 3 is a flow diagram illustrating the logic of a capabilities assessor and policy enforcer.

FIG. 3 illustrates the general logic of capabilities assessor 115 and policy enforcer 117. Capabilities assessor 115 is invoked automatically prior to execution of process 110 or directly by the user as shown in terminal 10. Automatic invocation can be triggered through any number of mechanisms depending on the specific embodiment. For example, in the Microsoft Windows operating system, process I 10 may be identified by a specific file type. A file type can be specified using a file extension, which is the alphanumeric characters following the period in the file name. A file type can be associated with a process that automatically services it.

Capabilities assessor 115 evaluates the functional potentiality of process 10 by scanning it for certain tokens, such as keywords or byte codes, that represent particular capabilities as shown in box 20. For example, in a script where source code is executed, capabilities assessor 115 might search for capability keywords such as FILE or PRINT and create a list of capabilities found using various parsing and compiler techniques known in the art. Some embodiments might end here, simply displaying or communicating the results of the capabilities assessment.

In the preferred embodiment, the list of process capabilities created in box 20 is passed on to policy enforcer 117, which begins by reading a policy as shown in box 30. Then for each capability found in process 110, the matching capability 210 in policy 200 is located using list searching techniques known in the art. If all of the corresponding authorizations 220 are present then there are no policy violations. The results from decision box 40 can then be used to automatically grant access, shown in box 50, to a process that does not violate policy 200 or to deny access, shown in box 60, to a process that violates policy 200. The results can also be presented to the user. If access is granted, process 10 may be permitted to execute. Policy enforcer 117 then ends as shown in terminal 70.

As an example, policy 200 may deny access to all resources 130 except the user interface, a specific set of virtual machine 120 capabilities. If process 110 contained a capability to read and write files it would violate policy 200 and be denied access. On the other hand, if process 110 only had a capability to display graphics, it would not violate policy 200 and be granted access.

In this description, capabilities assessment 20 is performed immediately prior to execution of process 110. However, the capabilities assessment may be generated at any time prior to execution resulting in a list of capabilities which can be included with the process itself or possibly maintained by a third party. This list can then be evaluated by policy enforcer 117 prior to execution of process 110. Capabilities assessor 115 and policy enforcer 117 can also be part of virtual machine 120.

In another embodiment, policy enforcer 117 supplements the capabilities assessment with other criteria, such as the context or origination of process 110, that can be specified in a policy. For example, a policy may authorize access to a process with more capabilities created from a trusted originator than an untrusted originator. Policy enforcer 117 may use authentication and code signing techniques, or other integrity strategies to establish its trustworthiness, to ensure that process 110 is in fact from the expected source. Policy enforcer 117 may maintain one or more separate policies based on the other criteria, such as level of trust or third-party authentication.

In another embodiment, policy enforcer 117 stores modification detection codes, such as checksums, CRC codes, digital signatures, message digests, etc. for frequently used processes. Certain policies may grant access to a previously authorized process that has not changed since its previous assessment.

Since other modifications and changes varied to fit particular operating requirements and environments will be apparent to those skilled in the art, the invention is not considered limited to the preferred embodiment or examples chosen for purposes of disclosure and covers all modifications and changes which do not constitute departures from the true spirit and scope of the invention.

What is claimed is:

1. A method for managing the risk of executing a software process by
   a.) in response to a request from a user or a software process X to execute a software process Y on a virtual machine, such process Y having access to a plurality of resources, such resources being any item under control of a virtual machine, said process Y consisting of a series of one or more instructions to be executed by a virtual machine, reading the instructions that define process Y, b.) determining the capabilities of process Y, such capabilities being defined in the context of a virtual machine, each capability being defined by one or more instructions, c.) reading a policy P containing a list of potential capabilities available for a virtual machine and corresponding procedures to be followed for each capability, d.) comparing capabilities with policy P to determine which procedures are applicable, e.) and performing said procedures before process Y is executed, whereby enabling a user to manage the risk of executing a software process.

2. The method of claim 1 further comprising a) a plurality of policies, each corresponding to a potential context, a context being a particular set of circumstances under which a software process may be executed, b) and a means of determining which policy should be applied to a given context, whereby enabling a user to manage the risk of executing a software process, based on a context-dependent policy and a particular context.

3. The method of claim 1 wherein capabilities are determined by scanning process Y for predefined byte-code sequences representing capabilities.

4. The method of claim 1 wherein capabilities are determined by reverse compiling process Y.

5. The method of claim 1 further comprising adding modification detection codes to capabilities of process Y and interpreting said modification detection codes on subsequent requests to execute process Y, whereby a determination can be made as to whether an existing list of capabilities for process Y can be relied upon as being accurate for subsequent requests to execute process Y.

6. A programmable apparatus for managing the risk of executing a software process, comprising:

a) a data reader that in response to a request from a user or a software process X to execute a software process Y on a virtual machine, such process Y having access to a plurality of resources, such resources being any item under control of a virtual machine, said process Y consisting of a series of one or more instructions to be executed by a virtual machine, reads the instructions that define process Y, b) a capabilities assessor that determines the capabilities of process Y, such capabilities being defined in the context of a virtual machine, each capability being defined by one or more instructions, c) a communications mechanism that provides information to a user or process, d) a policy enforcer that reads a policy, such policy containing a list of potential capabilities available for a particular virtual machine and corresponding procedures to be followed for each capability, and compares said capabilities with said policy to determine which procedures are applicable, and performing said procedures before process Y is executed, whereby enabling a user to manage the risk of executing a software process.

7. The apparatus of claim 6 further comprising a) a plurality of policies, each corresponding to a potential context, a context being a particular set of circumstances under which a software process may be executed, b) and a policy selector that determines which policy should be applied to a given context, whereby a decision can be made, based on a context-dependent policy, whether or not to execute software process Y given a particular context.

8. The apparatus of claim 6 wherein said capabilities assessor determines capabilities by scanning said process Y for predefined byte-code sequences representing capabilities.

9. The apparatus of claim 6 wherein capabilities assessor determines capabilities by reverse-compiling said software process to determine the capabilities.

10. The apparatus of claim 6 further comprising a means for adding modification detection codes to capabilities of process Y, and interpreting said modification detection codes on subsequent requests to execute process Y, whereby a determination can be made as to whether an existing list of capabilities for process Y can be relied upon as being accurate for subsequent requests to execute process Y.

11. A method for managing the risk of executing a software process by a) reading the instructions that make up software process Y, b) determining the capabilities expressed by said instructions, c) reading a policy P containing a list of potential capabilities available for a virtual machine and corresponding procedures to be followed for each capability, d) comparing capabilities with policy P, to determine which procedures are applicable e) and performing said procedures before process Y is executed, whereby enabling a user to manage the risk of executing a software process.

12. The method of claim 11 further comprising a) a plurality of policies, each corresponding to a potential context, a context being a particular set of circumstances under which a software process may be executed, b) determining which policy should be applied to a given context, whereby a decision can be made, based on a context-dependent policy, whether or not to execute software process Y given a particular context.

13. The method of claim 11 wherein capabilities are determined by scanning process Y for predefined byte-code sequences representing capabilities.

14. The method of claim 11 wherein capabilities are determined by reverse compiling process Y.

15. The method of claim 11 further comprising a means for adding modification detection codes to capabilities of process Y, and interpreting said modification detection codes on subsequent requests to execute process Y, whereby a determination can be made as to whether an existing list of capabilities for process Y can be relied upon as being accurate for subsequent requests to execute process Y.

* * * * *